Patented Feb. 23, 1943

2,312,298

UNITED STATES PATENT OFFICE 2,312,298

PROCESS OF PREPARING ESTERS OF CYCLIC KETALS

Kenneth E. Marple, Oakland, Calif., assignor to Shell Development Company, San Francisco, Calif., a corporation of Delaware No Drawing. Application March 28, 1941, Serial No. 385,730

6 Claims. (Cl. 260—338)

This invention relates to esters of cyclic ketals and to an improved method for preparing the same. More particularly, the invention is concerned with the organic esters of cyclic ketals obtained by reacting a carboxylic acid with a cyclic ketal from a trihydric alcohol and an aliphatic ketone containing at least 8 carbon atoms.

It is an object of the present invention to provide a class of high boiling esters of cyclic ketals. Another object of the invention is to provide an improved process for the manufacture of the esters of cyclic ketals. These and other more specific objects of the invention will be apparent from the description of the invention given hereinafter.

The products of the invention may be considered as compounds resulting from chemical interaction of three reactants, namely, a trihydric alcohol, an aliphatic ketone containing 8 or more carbon atoms, and carboxylic acid. By reacting the ketone with a trihydric alcohol, as was described and claimed in my copending application, Serial No. 380,508, filed February 25, 1941, a cyclic ketal is obtained which has a free hydroxy group and by esterifying this free hydroxy group with a carboxylic acid, the novel compounds of the invention are obtained. These compounds are carboxylic acid esters of cyclic ketals from a trihydric alcohol and an aliphatic ketone containing at least 8 carbon atoms.

The products are particularly useful compounds owing to the several distinct groups present in a single molecule of the compounds. The products are substituted 1,3-dioxolanes which contain hydrocarbon radicals linked in the 2-position to the dioxolane ring. In addition, the compounds contain an ester group. They are high boiling compounds of low volatility at ordinary temperatures. This property coupled with their unique chemical structure make them highly suitable as solvents, plasticizers, and the like.

The compounds may be derived from any suitable trihydric alcohol such as glycerol, alpha methyl glycerol, beta methyl glycerol, alpha isopropyl glycerol, beta secondary butyl glycerol, alpha methyl gamma ethyl glycerol, beta cyclopentyl glycerol, alpha cyclohexyl glycerol, alpha phenyl glycerol, 1,3,5-trihydroxy pentane, 1,2,6-trihydroxy hexane, 1,1,1-trimethylol propane and the like. The cyclic ketals are obtained by reaction of the trihydric alcohol with an aliphatic ketone containing at least 8 carbon atoms. By an aliphatic ketone, reference is made to straight-chain, branched-chain and cyclic ketones, all of which are devoid of aromatic groups. Thus, for example, among suitable ketones are included methyl hexyl ketone, ethyl pentyl ketone, propyl butyl ketone, methyl isohexyl ketone, isopropyl secondary octyl ketone, ditertiary butyl ketone, carone, fenchone, fenchosantanone, and the like. Other more complex ketones containing 8 or more carbon atoms such as may be obtained by ketonization of higher fatty acids, by condensation of ketones or ketones and aldehydes to form higher unsaturated ketones which may be saturated with hydrogen to yield higher complex aliphatic ketones, and by saturation of appropriate higher phenols followed by dehydrogenation of the carbinol group therein to form higher cyclic aliphatic ketones.

In the preferred method of executing the process of the invention, a cyclic ketal from any of the above-mentioned trihydric alcohols and aliphatic ketones is reacted and esterified with a carboxylic acid in the presence of an inorganic acid-acting catalyst while removing the water from the reaction mixture substantially as fast as formed by the reaction. The water of the reaction is removed with the aid of an agent in the reaction mixture which enables the water formed to be azeotropically distilled from the mixture during the course of the reaction. Agents employed for this purpose include lower aromatic hydrocarbons such as benzene, toluene, the xylenes, etc.; lower aliphatic hydrocarbons such as hexane, octane, iso-octane, cyclohexane, etc.; halogenated hydrocarbons such as ethylene dichloride, propylene dichloride, ethylene dibromide, chloroform, etc.; as well as substances such as dichloro-diethyl ether, gasoline, and the like. In general, the agent is an inert organic compound substantially insoluble in water with a normal boiling temperature between about 50° C. and 200° C.

The inorganic acid-acting catalysts employed in the process are acids such as hydrochloric acid, hydrobromic acid, sulfuric acid, phosphoric acid, or other mineral acids as well as acid-acting inorganic salts such as ammonium chloride, sodium bisulfate, zinc chloride, ferric chloride, and the like.

A variety of carboxylic acids may be employed to esterify the cyclic ketals including acetic acid, propionic acid, butyric acid, isobutyric acid, crotonic acid, chloroacetic acid, oleic acid, linoleic aid, stearic acid, palmitic acid, benzoic acid, naphthenic acids, and the like.

It is not necessary that the cyclic ketal of the trihydric alcohol and the ketone be in a pure condition when reacted with the carboxylic acid. For example, the trihydric alcohol and the aliphatic ketone containing at least 8 carbon atoms may be reacted in the presence of an acid-acting inorganic catalyst with azeotropic removal of the water of reaction from the reaction mixture substantially as fast as formed by means of an azeotrope-forming agent and subsequently a carboxylic acid may be added to the crude reaction mixture. Esterification of the cyclic ketal contained in the crude reaction mixture may then be effected by heating the mixture, the water of the esterification reaction being azeotropically removed from the reaction mixture substantially as fast as formed.

The esters of the cyclic ketals may also be prepared by employing a monocarboxylic acid ester of the trihydric alcohol and reacting this substance with a ketone of 8 or more carbon atoms. The reaction of the mono-ester with the ketone is conducted in the presence of an inorganic acid-acting catalyst and during the course of the reaction, the water of reaction is removed from the reaction mixture substantially as rapidly as formed with the azetrope-forming agent.

In each of the described methods for producing the carboxylic acid esters of the cyclic ketals, a good yield of the desired product may be obtained. The products of the invention are unstable in the presence of water and the acid-acting catalyst. It has been discovered that the products are, however, quite stable in the presence of the catalyst and in the absence of water and, therefore, the yields of the products are higher than was heretofore possible by preparing the compounds in the manner of the invention with continual removal of the water of reaction from the reaction mixture substantially as fast as it is formed.

If desired, the products may be produced by employing a different catalyst than the inorganic acid-acting substances. In this case, the cyclic ketal containing the free hydroxy group is reacted with a carboxylic acid anhydride. In effecting the esterification with these reactants, a basic-acting catalyst such as an alkali metal salt of a carboxylic acid which may be either the same or different from acid used as the anhydride is employed to catalyze the reaction. The dioxolane ring in the molecule of the products has good stability in the presence of basic-acting substances and good yields of products may be obtained by this method. For example, a cyclic ketal such as 2-methyl-2-hexyl-4-methylol-1,3-dioxolane may be reacted with acetic acid anhydride in the presence of sodium acetate to produce the acetic acid ester of the cyclic ketal.

In executing the process of the invention, the reaction mixture containing the reactants, the inorganic acid-acting catalyst, and the inert azeotrope-forming agent are heated in a vessel equipped with a fractionating column. The reaction mixture is boiled and the water formed by the reaction is vaporized from the reaction mixture along with the azeotrope-forming agent. The fractionating column is fitted with a separatory stillhead wherein the vapors from the mixture are condensed and separated into two layers, the water layer of which may ordinarily be discarded while the other layer may be returned to the column to supply reflux, if desired. Upon completion of the reaction, the catalyst may be neutralized with a suitable base and the product recovered from the reaction mixture, preferably, by distillation under reduced or subatmospheric pressure. The distillate containing the desired product may be contaminated with various by-products of the reaction such as the mono- and di-esters of the trihydric alcohol. It has been discovered that the distillate may be purified by dissolving it in a solvent in which water is substantially insoluble such as diethyl ether, diisopropyl ether, hexane, benzene, toluenene, iso-octane, etc., and extracting the impurities from the mixture with water, it having been found that in general the impurities are water soluble while the ester of the cyclic ketals are not appreciable so. After the extraction, the raffinate phase remaining may be distilled to recover the product in substantially pure condition.

The following examples are given for the purpose of illustrating the invention more fully, but it is to be undertsood that the invention is not to be construed as limited to the details or particular substances given therein.

*Example I*

An acetic acid ester was prepared by reacting acetic acid and a cyclic ketal containing a free hydroxy group. The cyclic ketal had been prepared by reacting glycerol and an aliphatic ketone containing 8 carbon atoms obtained by hydrating a cut of cracked paraffin wax to an alcohol and dehydrogenating the alcohol to the ketone. The ketone was probably methyl hexyl ketone.

A mixture of about 0.5 mol. of the cyclic ketal, 0.5 mol. of glacial acetic acid, 5 c. c. of concentrated hydrochloric acid, and 100 c. c. of benzene was heated to boiling temperature in a still fitted with a fractionating column to which was attached a separatory stillhead. The water formed by the reaction was removed substantially as fast as formed as an azeotrope with the benzene. The distillate was condensed in the stillhead and separated into two layers, the benzene layer being returned to the column as reflux. The heating was continued for about 5½ hours after which the acid in the reaction mixture was carefully neutralized and the mixture then distilled under reduced pressure to recover the desired product. The ester of the cyclic ketal was obtained in a yield of about 52.8 per cent while about 25.1 per cent of the cyclic ketal was recovered. The properties and analysis of the product which was a colorless liquid follow:

Boiling point, °C _____ 101–102 at 2.5 mm.
Specific gravity, 20/4 _____ 0.997
Refractive index, 20/D
  (Abbé) _____ 1.442
Carbon, per cent _____ 63.5, 63.4
  Theoretical _____ 63.6
Hydrogen, per cent _____ 10.0, 10.0
  Theoretical _____ 9.9

*Example II*

A mixture of about 2 mols of glycerol, 2 mols of the 8 carbon atom ketone, 5 c. c. of concentrated hydrochloric acid and 100 c. c. of benzene was heated at boiling temperature in a still equipped with a fractionating column and separatory stillhead. The azetropic distillate containing the water of reaction was continuously condensed during the course of the ketalization reaction and separated into a water layer which was discarded and a benzene layer which was returned to the column to supply reflux. Upon completion of the ketalization reaction, 2 mols of glacial acetic acid were added to the crude reaction mixture and the heating continued whereupon the water of the esterification reaction was separated azeotropically with the aid of the benzene substantially as fast as formed. After the reaction was finished, the reaction mixture was carefully neutralized and subjected to vacuum distillation. About 37 per cent of the ketone was recovered unchanged while a yield of about 51.8 per cent of the ester of the cyclic ketal was obtained.

*Example III*

About 1.7 mols of monoacetin, 1.7 mols of the 8 carbon atom aliphatic ketone, 5 c. c. of concentrated hydrochloric acid and 100 c. c. of benzene were heated at boiling temperature in a still fitted with a fractionating column and a separatory stillhead. The heating was continued for a period of about 6 hours during which time the water of reaction was removed from the reaction mixture as an azeotrope with benzene substantially as fast as formed. At the end of this time, the acid present in the mixture was carefully neutralized and the mixture distilled in vacuo. The fraction containing the desired ester of the cyclic ketal was contaminated with monoacetin as well as diacetin, acetic acid, etc. The fraction weighed about 277 gms. and contained about 27 per cent acetic acid. This was dissolved in approximately 200 c. c. of ethyl ether and the mixture was washed with about 150 c. c. of water to free it of the impurities therein. The ether-containing mixture was then distilled and the acetic acid ester of the cyclic ketal obtained in a yield amounting to about 48.6 per cent. About 45.8 per cent of the ketone was recovered unchanged.

This application is a continuation-in-part of my copending application, Serial No. 380,508, filed February 25, 1941.

I claim as my invention:

1. In a process for the production of an acetic acid ester of a cyclic ketal, the step which comprises reacting acetic acid with a cyclic ketal from glycerol and an aliphatic ketone containing at least 8 carbon atoms in the presence of hydrochloric acid, said reaction being effected by boiling the reaction mixture and distilling therefrom the water of reaction as an azeotrope with benzene substantially as fast as formed.

2. In a process for the production of a carboxylic acid ester of a cyclic ketal, the step which comprises reacting an aliphatic carboxylic acid with a cyclic ketal of glycerol and an aliphatic ketone in the presence of an acid-acting catalyst, said reaction being effected by boiling the reaction mixture and distilling therefrom the water of reaction as an azeotrope with a lower aromatic hydrocarbon substantially as fast as formed.

3. In a process for the production of a carboxylic acid ester of a cyclic ketal, the step which comprises reacting an aliphatic carboxylic acid with a cyclic ketal of glycerol and an aliphatic ketone in the presence of an acid-acting catalyst while removing the water of reaction from the reaction mixture substantially as fast as formed by distillation with an inert organic azeotrope-forming agent.

4. In a process for the production of a carboxylic acid ester of a cyclic ketal, the method which comprises reacting an aliphatic ketone containing at least 8 carbon atoms with glycerol and subsequently subjecting the crude reaction mixture to treatment with an aliphatic carboxylic acid whereby esterification of the formed cyclic ketal occurs, said reactions being effected in the presence of an inorganic acid-acting catalyst by boiling the reaction mixtures and distilling therefrom the water of reaction as an azeotrope with a lower aromatic hydrocarbon substantially as fast as formed.

5. In a process for the production of a carboxylic acid ester of a cyclic ketal, the method which comprises reacting a trihydric alcohol with an aliphatic ketone containing at least 8 carbon atoms in the presence of an inorganic acid-acting catalyst and subsequently reacting the formed cyclic ketal contained in the crude mixture with a carboxylic acid in the presence of an inorganic acid-acting catalyst, each reaction being effected while removing the water of reaction from the reaction mixture substantially as fast as formed by distillation with an inert organic azeotrope-forming agent.

6. In a process for the production of a carboxylic acid ester of a cyclic ketal, the step which comprises reacting a carboxylic acid with a cyclic ketal from a trihydric alcohol and an aliphatic ketone containing at least 8 carbon atoms in the presence of an inorganic acid-acting catalyst while removing the water of reaction from the reaction mixture substantially as fast as formed by distillation with an inert organic azeotrope-forming agent.

KENNETH E. MARPLE.